(12) United States Patent  (10) Patent No.: US 7,644,631 B1
Bard et al.  (45) Date of Patent: Jan. 12, 2010

(54) ELECTRONICS CABINET ACOUSTICAL AND THERMAL TEST DEVICE

(75) Inventors: Seth E. Bard, Poughkeepsie, NY (US); Robert N. Boyes, Jr., Poughkeepsie, NY (US); Ethan E. Cruz, LaGrangeville, NY (US); Matthew A. Nobile, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/351,297

(22) Filed: Jan. 9, 2009

(51) Int. Cl.
*G01F 1/00* (2006.01)
(52) U.S. Cl. ...................................... 73/861
(58) Field of Classification Search ............... 73/865.6, 73/861; 361/687; 381/71; 324/760
See application file for complete search history.

(56) References Cited

U.S. PATENT DOCUMENTS

| | | | |
|---|---|---|---|
| 5,511,127 | A | 4/1996 | Warnaka |
| 6,119,521 | A | 9/2000 | Shivashankara et al. |
| 6,604,603 | B1 | 8/2003 | Wirth |
| 7,070,323 | B2 * | 7/2006 | Wanek et al. ............... 374/45 |
| 2003/0066630 | A1 | 4/2003 | Meguro et al. |
| 2003/0198018 | A1 | 10/2003 | Cipolla et al. |
| 2004/0217072 | A1 | 11/2004 | Bash et al. |
| 2004/0218355 | A1 | 11/2004 | Bash et al. |
| 2004/0264124 | A1 | 12/2004 | Patel et al. |
| 2006/0014455 | A1 | 1/2006 | Sheffer |

OTHER PUBLICATIONS

Paschal Minogue et al.; "Adaptively Canceling Server Fan Noise—Principles and Experiments with a Short Duct and the AD73522 dspConverter"; Analog Dialogue 34-2 (2000) pp. 1-6.
Chad N. Himmel, P.E.; "Improvement of Through-Wall Air Conditioner Transmission Loss"; Fan Noise 2003 International Symposium Senlis, Sep. 23-25, 2003; pp. 1-8.
Stork Materials Technology; "Acoustic Testing"; www.storkct.com; Datasheet; Nov. 3, 2000 ds No. 614 v. 1.
G. C. Maling, Jr. et al.; "Reverberation Chamber Determination of the Acoustic Power of Pure-Tone Sources"; Acoustic Power Measurement; IBM Journal Sep. 1967; pp. 492-501.

* cited by examiner

*Primary Examiner*—Jewel Thompson
(74) *Attorney, Agent, or Firm*—Cantor Colburn LLP; Gerry Monteleone

(57) ABSTRACT

An electronics component cabinet cover test device includes a housing that defines a test apparatus provided with first and second openings. A cover member is mounted to one of the openings, and an air moving device is arranged in the test apparatus. The air moving device includes an air inlet and an air outlet and generates airflow within the test apparatus. A sensor capable of measuring a characteristic of the airflow is mounted within the test apparatus. An airflow impedance device mounted to the inlet or the outlet of the air moving device. The airflow impedance device is configured to simulate an airflow obstruction. A controller establishes a flow rate of air from the air moving device and receives airflow data corresponding to the characteristic of the airflow from the sensor to determine one of an acoustical performance characteristic and a thermal performance characteristic of the cover member.

20 Claims, 8 Drawing Sheets

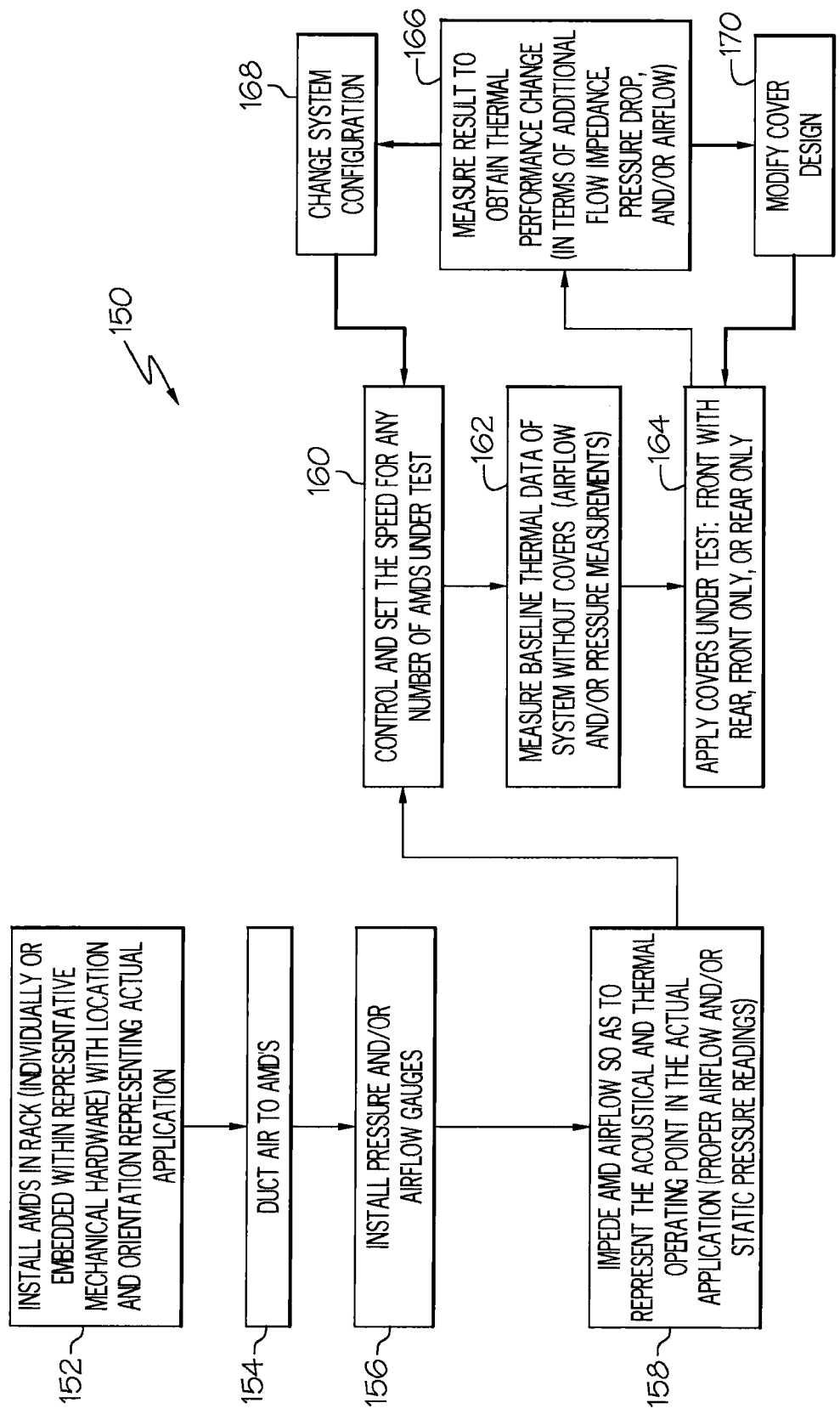

ELECTRONICS CABINET ACOUSTICAL AND THERMAL TEST DEVICE

BACKGROUND

This invention relates to the art of test devices and, more particularly, to an acoustical and thermal test device for electronics cabinets.

In general, electronics cabinets, such as server racks, include low impedance acoustical covers that attenuate sound while also ensuring adequate airflow to electronic components. Conventionally, cover attenuation is tested by mounting a cover onto an open side of an otherwise enclosed reflective box containing a noise source. Flow impedance properties of the cover are measured by uniformly drawing air through a cover mounted on a flow bench. Neither of the current test procedures account for actual flow characteristics and acoustical noise emission properties of real air moving devices (AMD) physically located within the cabinet. Given that actual locations and emissions characteristics of the real air moving devices diverge from theoretical uniformity across the cover, results obtained from the current test procedures do not reflect actual flow and emission characteristics with any accuracy.

Other existing test procedures include calculating airflow via changes in electronic component temperatures and noise attenuation by measuring a functional system with and without covers. While this test procedure provides results that are more accurate than those obtained from the above-described procedures, waiting for actual production level components moves testing to a latter part of a design cycle. In many instances, testing late in the design cycle does not provide adequate lead time to design and manufacture covers for regulatory compliance testing.

SUMMARY

In accordance with exemplary embodiments of the invention, an electronics component cabinet cover test device includes a housing having top, bottom, and opposing side walls that collectively define a test apparatus provided with first and second openings. At least one test cover member is mounted to one of the first and second openings, and at least one selectively positionable air moving device is arranged in the test apparatus. The at least one selectively positionable air moving device includes an air inlet and an air outlet and generates an airflow within the test apparatus. At least one sensor is mounted within the test apparatus. The at least one sensor is capable of measuring a characteristic of the airflow. At least one airflow impedance device is mounted to one of the inlet and the outlet of the at least one selectively positionable air moving device. The at least one airflow impedance device is configured to simulate an airflow obstruction within the test apparatus. A controller is operatively connected to the at least one selectively positionable air moving device and the at least one sensor. The controller establishes a flow rate of air from the at least one selectively positionable air moving device and receives airflow data corresponding to the characteristic of the airflow from the at least one sensor to determine one of an acoustical performance characteristic and a thermal performance characteristic of the at least one test cover member.

In accordance with another exemplary embodiment of the invention, a method of testing an electronics component cabinet cover includes generating an airflow in an electronics component cover test device, impeding the airflow to simulate at least one electronic component mounted in the electronic components cover test device, mounting at least one test cover member to the electronic component cover test device, and sensing a characteristic of the airflow generated in the electronic component cover test device. The airflow characteristic representing one of an acoustical performance characteristic and a thermal performance characteristic of the airflow based upon a corresponding acoustic property and thermal property of the at least one test cover member.

Additional features and advantages are realized through the techniques of exemplary embodiments of the invention. Other exemplary embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 8 is a flow diagram illustrating a method of testing thermal performance of a cover mounted to the electronics component cabinet test device of FIG. 1.

Figure 1:
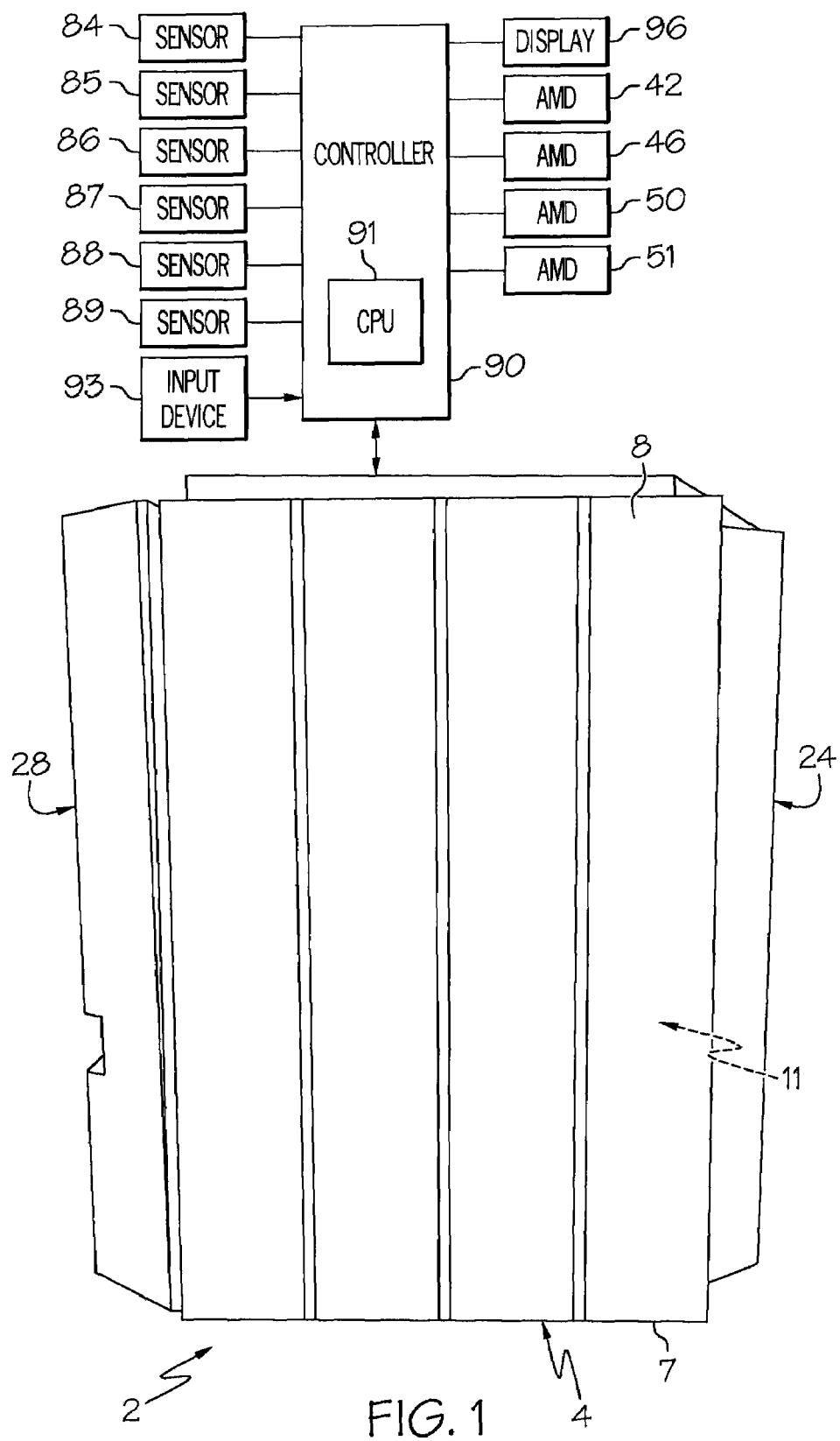
FIG. 1 is a left side elevational view of an electronics component cabinet test device constructed in accordance with an exemplary embodiment of the invention.
Figure 2:
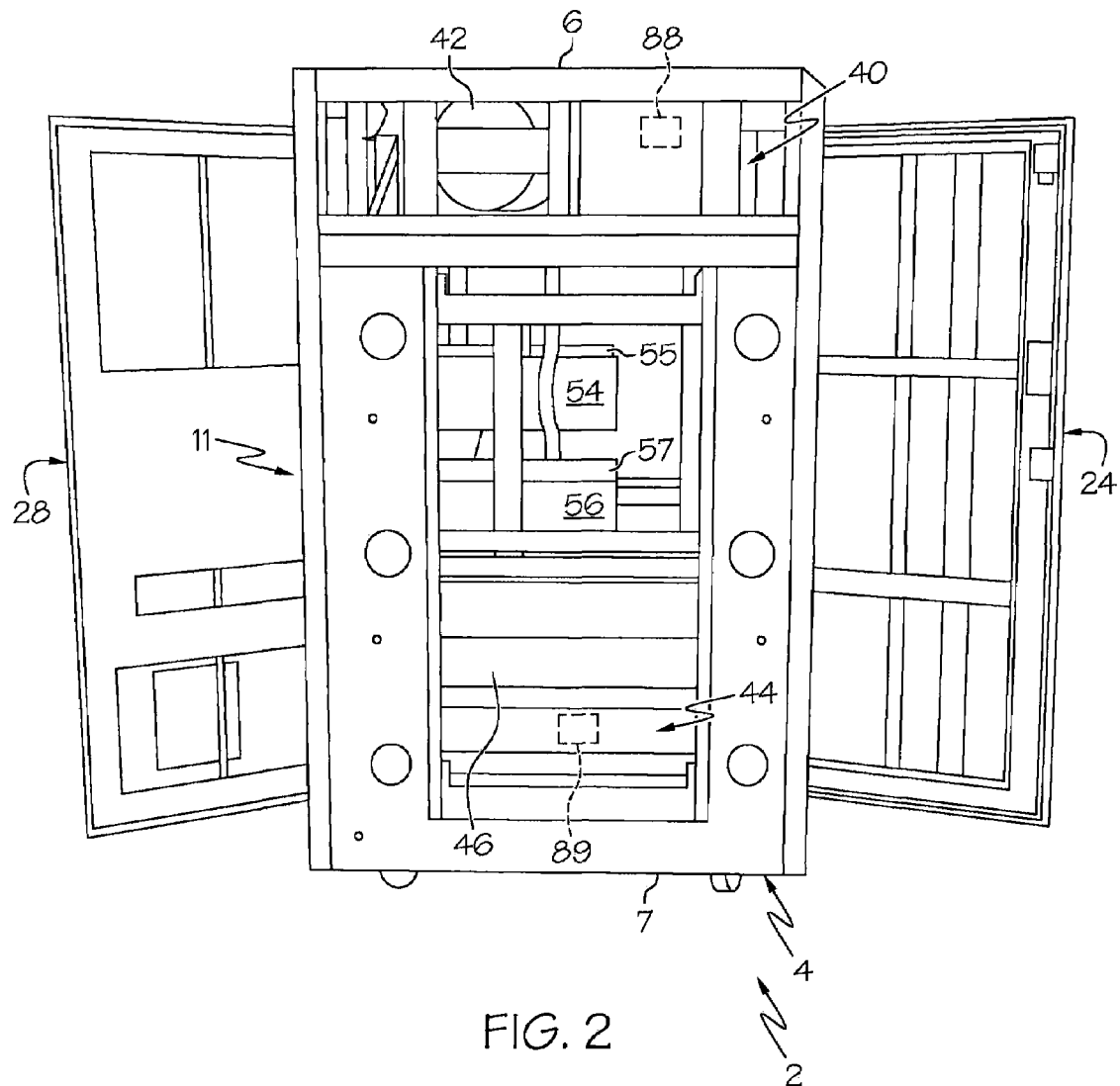
FIG. 2 is a partially exploded, left side elevational view of the electronics component cabinet test device of FIG. 1.
Figure 3:
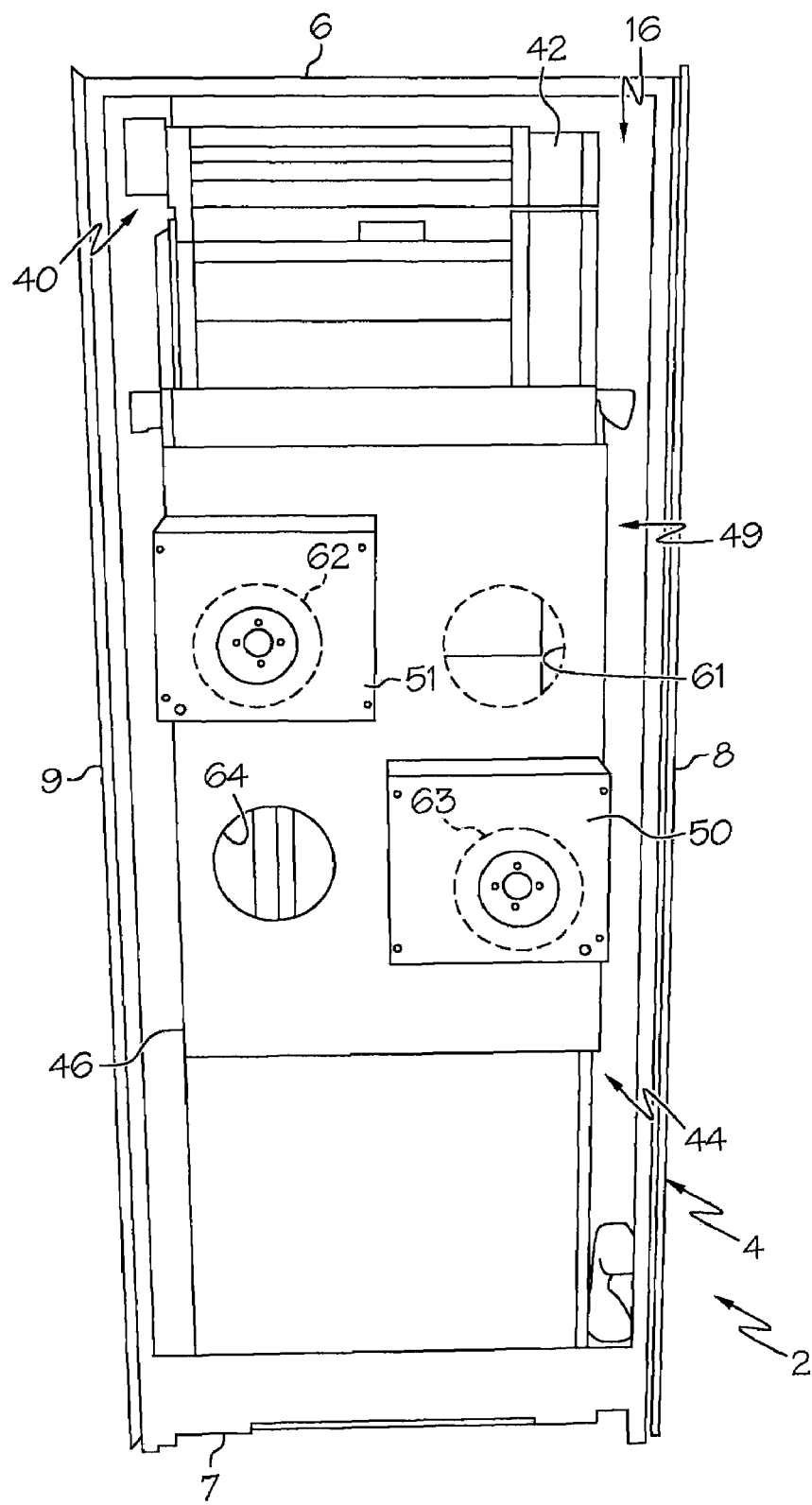
FIG. 3 is a rear elevational view of the electronics component cabinet test device of FIG. 1.
Figure 4:
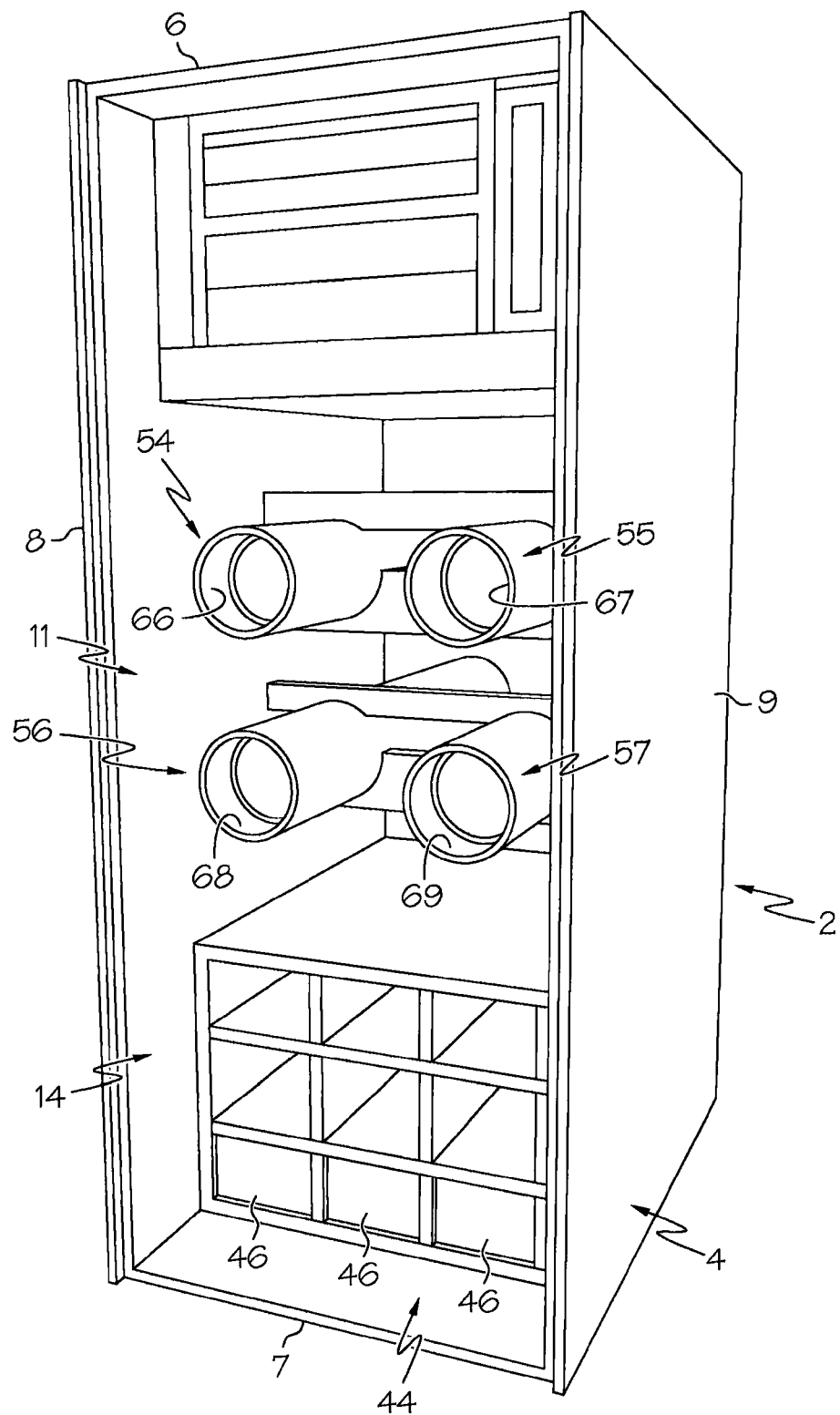
FIG. 4 is a front right side perspective view of the electronics component cabinet test device of FIG. 1.

The detailed description explains the exemplary embodiments of the invention, together with advantages and features, by way of example with reference to the drawings.

DETAILED DESCRIPTION

With initial reference to FIGS. 1 through 4 an electronic component system cabinet cover test device constructed in accordance with exemplary embodiments of the invention is indicated generally at 2. Test device 2 includes a housing 4 having a top wall 6, a bottom wall 7, and opposing side walls 8 and 9 that collectively define a test apparatus 11. As shown, test apparatus 11 includes a first or front opening 14 and a second or rear opening 16. A first or front test cover member 24 is mounted to front opening 14 and a second or rear test cover member 28 is mounted to rear opening 16. Each test cover member 24, 28 is designed to limit acoustical emissions created by electronic components within test device 2 while, simultaneously, allowing sufficient airflow to pass through housing 4 to provide cooling to the electronic components. In accordance with the exemplary embodiment shown, test device 2 is configured to test the efficacy of acoustical attenuation and thermal flow through test apparatus 11, of test cover members 24 and 28 as will be discussed more fully below.

In accordance with the exemplary embodiment of the invention, test device 2 includes a first plenum or test zone 40 having arranged therein an air moving device (AMD) 42, a second plenum or test zone 44 including an air moving device (AMD) 46, and a third plenum or test zone 49 including a first air moving device (AMD) 50 and a second air moving device (AMD) 51. As will be discussed more fully below, each air moving device 50, 51 is selectively positionable within third test zone 49.

In further accordance with the exemplary embodiment shown, test device 2 includes a plurality of conduits 54-57 that extend within third test zone 49. Conduits 54-57 deliver airflow through test zone 11 that simulates a corresponding airflow in a cabinet to be tested. Towards that end, each conduit 54-57 includes a corresponding outlet portion 61-64 as well as a corresponding inlet portion 66-69. As shown, each air moving device 50, 51 is arranged at outlet portions 62 and 63 of conduits 55 and 56. In this manner, air moving devices 50 and 51 are selectively operated to generate an airflow that passes through conduits 55 and 56 so as to simulate cooling within an electronic component cabinet configuration.

Figure 5:
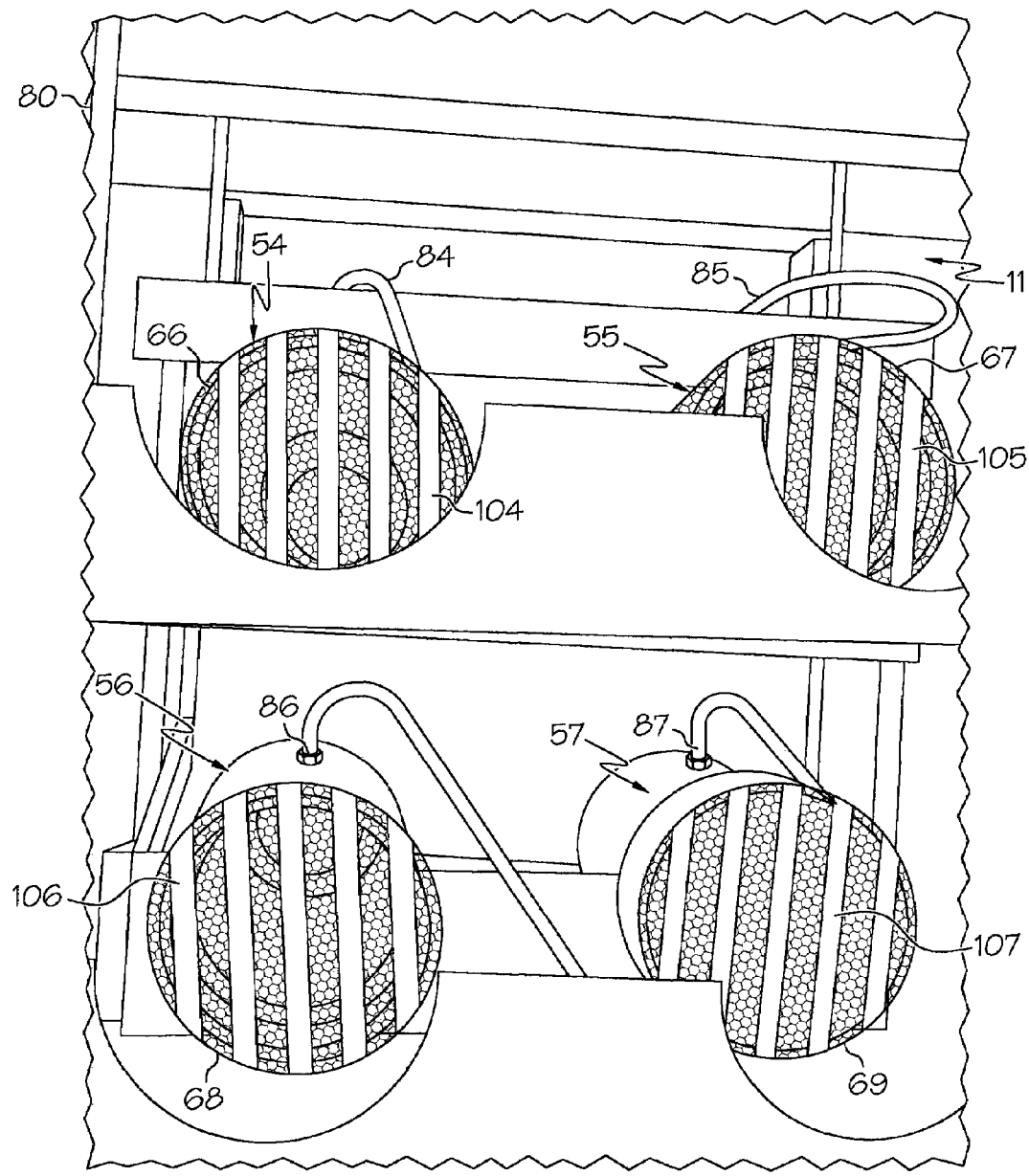
FIG. 5 is a detail view illustrating an airflow impedance device mounted in the electronics component cabinet test device of FIG. 1.

As best shown in FIG. 5, each conduit 54 through 57 includes a corresponding sensor 84-87 that is configured to sense an airflow characteristic. More specifically, sensors 84-87 are configured to sense airflow rate and/or pressure of an airflow passing through conduits 54-57. In addition to sensors 84-87, additional sensors 88 and 89 are positioned in zones 40 and 44 respectively. As shown, each sensor 84-89 is electrically connected to a controller 90 having a CPU 91. Controller 90 is also linked to an input device 93 as well as a display 96 and AMD's 42, 46, 50 and 51. With this configuration, a test engineer may input test parameters to controller 90, with CPU 91 receiving signals from sensors 84-87 indicative of airflow characteristics that are then presented on display 96.

In further accordance with the exemplary embodiment shown, test device 2 includes a plurality of airflow impedance devices 104-107 arranged on inlet portions 66-69 of conduits 54-57 respectively. Airflow impedance devices 104-107 are designed to simulate the presence of electronic components within test device 2. In this manner, test device 2 more closely approximates an actual electronic component systems cabinet for testing acoustical and thermal characteristics of test cover members 24 and 28 as will be discussed more fully below.

Figure 6:
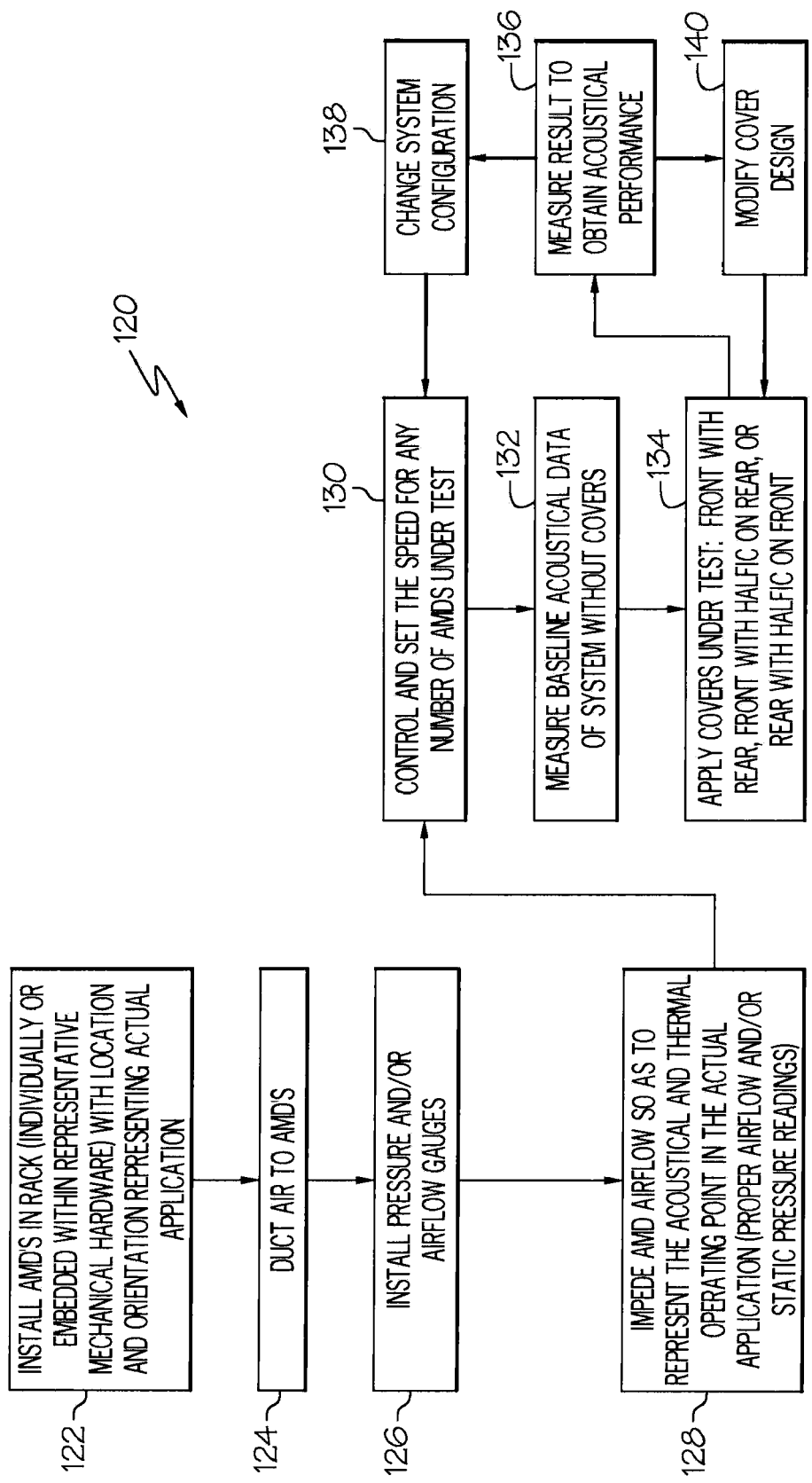
FIG. 6 is a flow diagram illustrating a method of testing acoustical performance of a cover mounted to the electronics component cabinet test device of FIG. 1.
Figure 7:
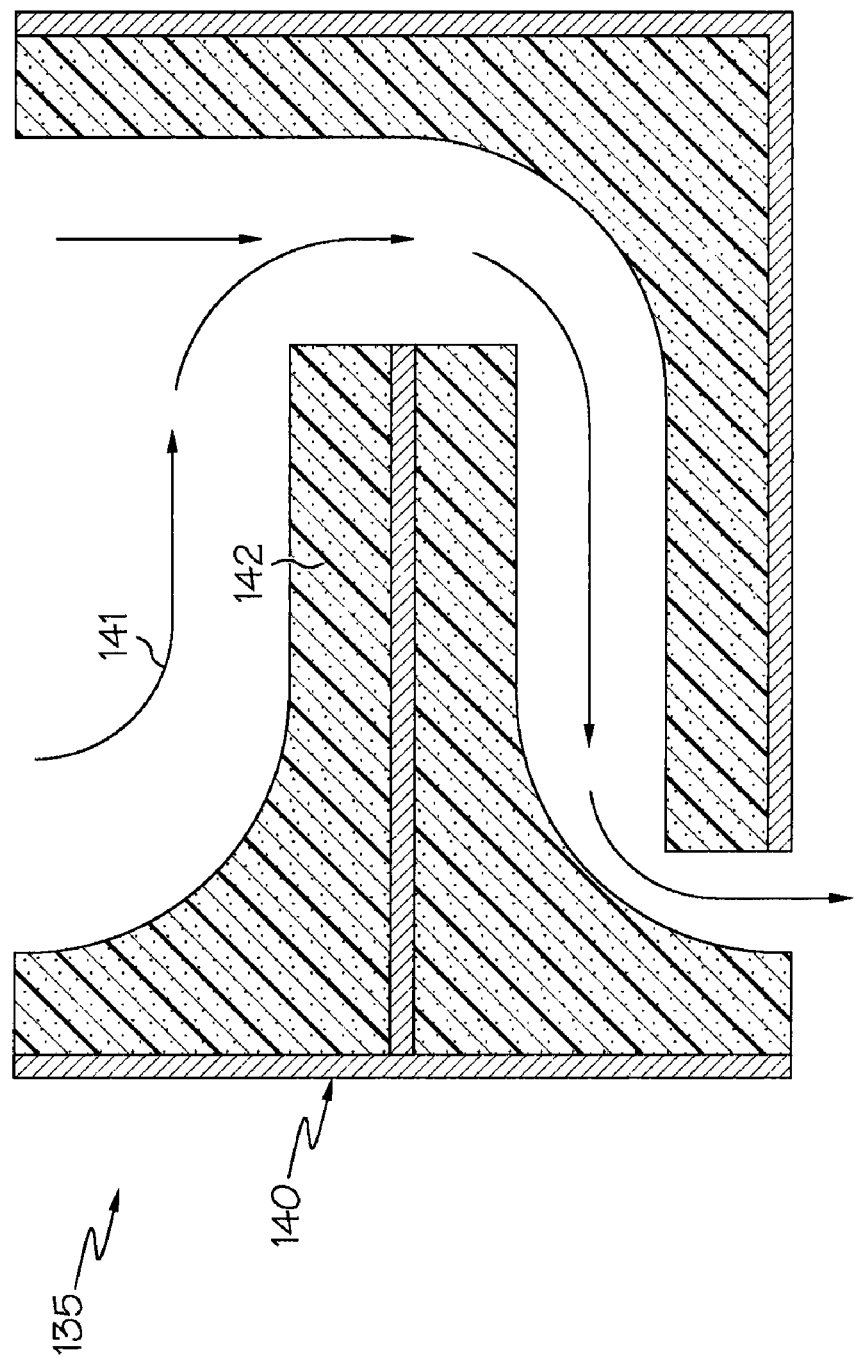
FIG. 7 is an upper plan view of a highly attenuating low flow impedance cover in accordance with an exemplary embodiment of the invention.

Reference will now be made to FIG. 6 in describing a method 120 of testing acoustical characteristics of a component cover in accordance with an exemplary embodiment of the invention. Initially, air moving devices are installed within test device 2. The air moving devices are either mounted individually or embedded within representative mechanical hardware with particular locations and orientations resembling an actual cabinet configuration as indicated in block 122. At this point, air is ducted to the air moving devices as indicated in block 124 and pressure and/or airflow sensors 84-87 are installed to conduits 54-57 as indicated in block 126. At this point, appropriate airflow impedance devices 104-107 are selectively positioned upon inlet portions 66-69 of conduits 54-57 as indicated in block 128. Input device 93 is then employed to set and control speed for select ones of the air moving devices for a particular test configuration as indicated at block 130. Once the speed of each air moving device is set, a baseline acoustical data set is captured via standardized measurements and instrumentation (not shown) for test device 2 arranged without cover members as indicated at block 132. After acquiring the baseline acoustical data set, test cover members 24 and/or 28 are mounted to front and/or rear openings 14 and 16 as indicated in block 134. If an opening is not provided with a test cover member 24, 28, a Highly Attenuating Low Flow Impedance Cover (HALFIC) 135 (See FIG. 7) is installed over the un-covered opening 14 or 16. Once the test cover members and/or HALFIC are installed, a second acoustical data set is captured and the acoustical performance of the installed test cover member(s) is determined, as indicated in block 136. Based on the results obtained in block 136, changes are made to the existing test configuration as indicated in block 138. That is, current AMD's are removed, additional AMD's are added, and/or the speed of one or more AMD is changed. Alternatively, the cover design of a particular test cover is modified in order to meet desired test parameters as indicated in block 140.

As discussed above, HLFIC 135 is affixed to test device 2 during acoustical testing in the event that only a single test cover member 24, 28 is being evaluated. HALFIC 135 includes a main body 140 having a low airflow impedance flow path 141 defined by an acoustically absorptive material 142, e.g., acoustical foam that is configured so as to have an insignificant impact on AMD's 42, 46, 50 and 51. In addition, acoustically absorptive material 142 provides acoustical attenuation that greatly exceeds acoustical attenuation levels provided by the particular test cover member 24, 28 under evaluation. In this manner, when measured acoustical attenuation of test device 2 is compared with baseline attenuation data, the measured attenuation reflect only attenuation characteristic of the test cover member 24, 28 under evaluation.

Reference will now be made to FIG. 8 in describing a method 150 of determining thermal characteristics of a test cover member in accordance with exemplary embodiments of the present invention. In a manner similar to that described above, air moving devices are installed in test device 2 either individually or embedded within representative mechanical hardware, as indicated in block 152. Air is then ducted to the air moving devices as indicated in block 154, and pressure or airflow sensors 84-87 are installed as indicated in block 156. At this point, airflow impedance devices 104-107 are selectively installed into conduits 54-57 in order to represent actual thermal operating point of an exemplary systems of a cabinet to be tested. The speed and number of air moving devices is set as indicated in block 160 and baseline thermal data is obtained in block 162. After obtaining the baseline thermal data, test covers are applied to front opening 14 and/or rear opening 16 as indicated in block 164. At this point, sensors 84-87 are polled to obtain thermal performance changes, in terms of, for example, additional flow impedance, pressure drop, and/or airflow, resulting from the particular test cover member to be tested as indicated in block 166. Based on the results obtained, system configurations are changed as indicated in 168 and/or test cover members are modified, the designed to meet test parameters, as indicated in block 170.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. An electronics component cabinet cover test device comprising:
   a housing having top, bottom, and opposing side walls that collectively define a test apparatus including first and second openings;
   at least one test cover member mounted to one of the first and second openings;
   at least one selectively positionable air moving device arranged in the test apparatus, the at least one selectively positionable air moving device including an air inlet and an air outlet and generates an airflow within the test apparatus;
   at least one sensor mounted within the test apparatus, the at least one sensor being capable of measuring a characteristic of the airflow;
   at least one airflow impedance device mounted to one of the inlet and the outlet of the at least one selectively positionable air moving device, the at least one airflow impedance device being configured to simulate an airflow obstruction within the test apparatus; and
   a controller operatively connected to the at least one selectively positionable air moving device and the at least one sensor, the controller establishing a flow rate of air from the at least one selectively positionable air moving device and receiving airflow data corresponding to the characteristic of the airflow from the at least one sensor to determine one of an acoustical performance characteristic and a thermal performance characteristic of the at least one test cover member.

2. The electronics component cabinet test device according to claim 1, wherein the test apparatus includes a first test zone arranged adjacent the top wall, a second test zone arranged adjacent the bottom wall and a third test zone arranged between the first and second test zones, the at least one selectively positionable air moving device being mounted in one of the first, second and third test zones.

3. The electronics component cabinet test device according to claim 2, wherein the at least one selectively positionable air moving device includes a plurality of selectively positionable air moving devices selectively positioned in at least two of the first, second and third test zones.

4. The electronics component cabinet test device according to claim 1, wherein the at least one sensor is a flow sensor, the flow sensor sensing a flow rate characteristic of the airflow.

5. The electronics component cabinet test device according to claim 1, wherein the at least one sensor is a pressure sensor, the pressure sensor sensing a pressure characteristic of the airflow.

6. The electronics component cabinet test device according to claim 1, wherein the at least one sensor comprises a flow sensor and a pressure sensor, the flow sensor sensing a flow rate characteristic of the airflow and the pressure sensor sensing a pressure characteristic of the airflow.

7. The electronics component cabinet test device according to claim 1, wherein the controller establishes a flow rate of air from the at least one selectively positionable air moving device and receives airflow data corresponding to the characteristic of the airflow from the at least one sensor to determine both an acoustical performance characteristic and a thermal performance characteristic of the test cover member.

8. The electronics component cabinet test device according to claim 1, further comprising: another test cover member mounted to the other of the first and second openings.

9. The electronics component cabinet test device according to claim 8, wherein the controller establishes a flow rate of air from the at least one selectively positionable air moving device and receives airflow data corresponding to the characteristic of the airflow from the at least one sensor to determine one of an acoustical performance characteristic and a thermal performance characteristic of the cover member and the other test cover member.

10. The electronics component cabinet test device of claim 1, further comprising: a highly attenuation low flow impedance cover mounted to another of the first and second openings.

11. The electronics component cabinet test device of claim 10, wherein the highly attenuation low flow impedance cover includes a low airflow impedance flow path, the low airflow impedance flow path providing acoustical attenuation that exceeds acoustical attenuation levels provided by the at least one test cover member.

12. The electronics component cabinet test device of claim 11, wherein the low airflow impedance flow path is defined by an acoustically absorptive material.

13. The electronics component cabinet test device of claim 12, wherein the acoustically absorptive material is acoustic foam.

14. A method of testing an electronics component cabinet cover, the method comprising:
   generating an airflow in an electronics component cover test device;
   impeding the airflow to simulate at least one electronic component mounted in the electronic components cover test device;
   mounting at least one test cover member to at least one of first and second openings formed in the electronic component cover test device; and
   sensing a characteristic of the airflow generated in the electronic component cover test device, the airflow characteristic representing one of an acoustical performance characteristic and thermal performance characteristic of the airflow based upon a corresponding acoustical and thermal property of the test cover member.

15. The method of claim 14, wherein sensing a characteristic of the airflow comprises sensing both the acoustical and thermal characteristic of the airflow based upon the corresponding acoustical and thermal property of the test cover member.

16. The method of claim 14, further comprising: mounting another test cover member to another of the first and second openings of the electronic component cover test device; and
   sensing a characteristic of the airflow generated in the electronic component cover test device, the airflow characteristic representing one of an acoustical and thermal characteristic of the airflow based upon a corresponding acoustical and thermal property of the test cover and the another test cover member.

17. The method of claim 14, wherein sensing a characteristic of the airflow includes sending a flow rate of the airflow generated in the electronic component cover test device.

18. The method of claim 14, wherein sensing a characteristic of the airflow includes sending a pressure of the airflow generated in the electronic component cover test device.

19. The method of claim 14, further comprising: obtaining baseline data of the airflow characteristic of the airflow generated in the electronic component cover test device without a test cover member.

20. The method of claim 13, further comprising: mounting a highly attenuation low flow impedance cover to another of the first and second openings of the electronic component cover test device.

* * * * *